Figure 1:
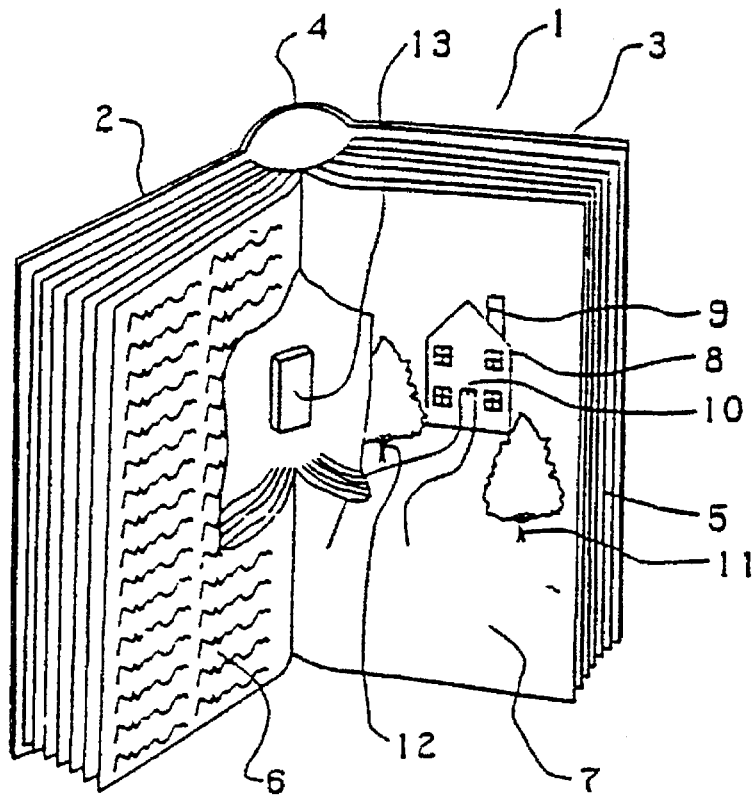

United States Patent [19]

Jessop

[11] Patent Number: 5,645,432
[45] Date of Patent: Jul. 8, 1997

[54] TOY OR EDUCATIONAL DEVICE

[76] Inventor: Richard Vernon Jessop, 15 Maresfield Gardens, Hampstead, London, United Kingdom, NW3 5SN

[21] Appl. No.: 507,493
[22] PCT Filed: Feb. 26, 1993
[86] PCT No.: PCT/GB93/00397
 § 371 Date: Aug. 28, 1995
 § 102(e) Date: Aug. 28, 1995
[87] PCT Pub. No.: WO93/17764
 PCT Pub. Date: Sep. 16, 1993

[30] Foreign Application Priority Data

Feb. 26, 1992 [GB] United Kingdom ............... 9204128

[51] Int. Cl.⁶ ......................................... C09B 5/00
[52] U.S. Cl. ........................ 434/322; 434/308; 434/317
[58] Field of Search ............................. 434/308, 309, 434/317, 322

[56] References Cited

U.S. PATENT DOCUMENTS 4,372,558  2/1983  Shimamoto et al. .
4,848,767  7/1989  Correro .
4,884,974  12/1989  DeSmet .
4,990,092  2/1991  Cummings .
5,011,156  4/1991  LaChance, Jr. et al. .

FOREIGN PATENT DOCUMENTS 2112990  7/1983  United Kingdom .

OTHER PUBLICATIONS

Texas Instruments' 1990 Educational Products brochure, p. 13.

Primary Examiner—Richard J. Apley
Assistant Examiner—Glenn E. Richman
Attorney, Agent, or Firm—Kurt R. Benson

[57] ABSTRACT

A toy or educational device includes front and back covers, a spine, a plurality of pages, a plurality of pressure sensors mounted in the front and back covers and a sound generator connected to the pressure sensors. The pressure sensors are responsive to the application of pressure to an aligned location of a page overlying the corresponding cover for actuating the sound generator to generate sounds associated with both the location of the sensor which is depressed and the page to which pressure is applied.

7 Claims, 4 Drawing Sheets

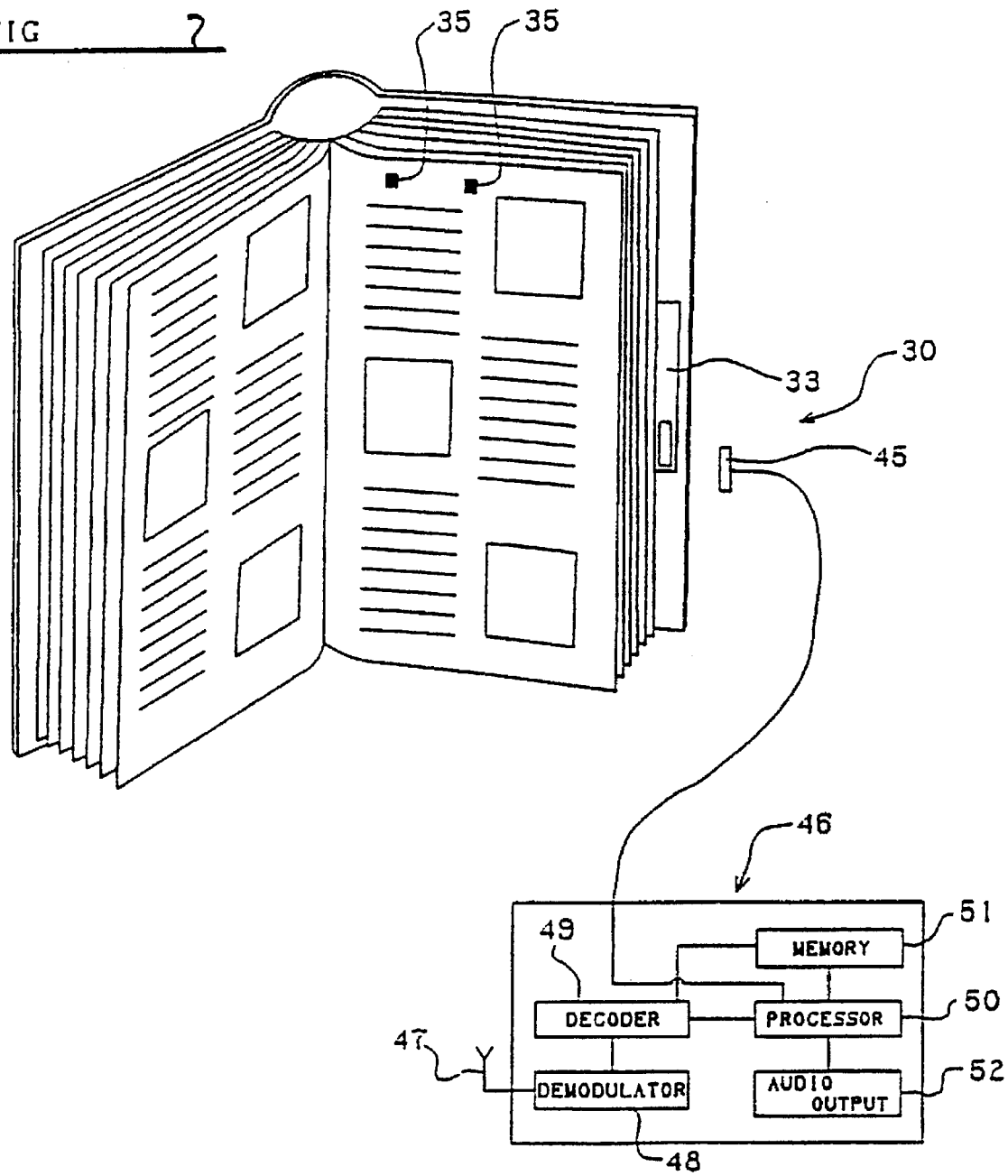

TOY OR EDUCATIONAL DEVICE

THE PRESENT INVENTION relates to a toy or educational device and seeks to provide a novel toy or educational device which will retain the attention of a person using the toy or educational device.

According to this invention there is provided a book or magazine comprising front and back covers and a plurality of pages carrying printing; a pressure sensor located in at least one of the front and back covers for sensing the position at which pressure is applied to the corresponding cover; and a sound generator connected to the pressure sensor wherein the pressure sensor being adapted to cause the sound generator to generate sounds associated with the position at which a finger presses against the page overlying the cover and in dependence upon the page which is pressed.

According to a preferred embodiment of the invention a book or magazine comprising front and back covers and a plurality of pages carrying printing, sensor means carried on the book and mounted on at least one of the front and back covers of the book to sense where a finger touches a page, and a sound generator connected to the sensor means wherein the sensor means are adapted to cause the sound generator to generate sounds associated with the position at which the finger touches the pages, and in dependence upon the page which is touched.

Preferably the said sound generator means are contained within a housing which is mounted in a cover of the book or mounted within the spine of the book, but alternatively the sound generator means may be separated from the book, means being provided to pass signals from the book to the sound generator means. An electrical connection may be provided including a plug and a socket which extends between the book and the sound generator means. Alternatively, the book may be provided with means adapted to transmit signals in response to a finger touching a pre-determined area on a page of the book, the said sound generator being provided with means adapted to receive the signals.

Conveniently the signals are indicative of the area of the page that has been touched, the means associated with the book containing a memory storing signals appropriate to be passed to sound generating means when each area is touched.

Conveniently the sensor comprises areas positioned in alignment with page numbers printed on the pages and areas in alignment with areas of the pages to be touched.

Figure 2:
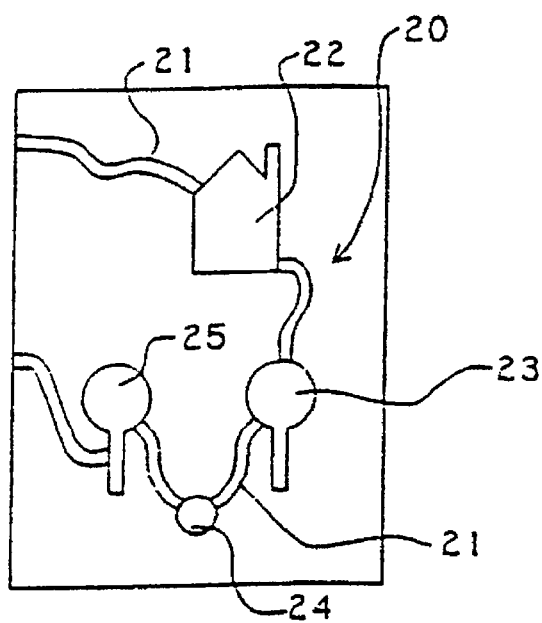
Figure 3:
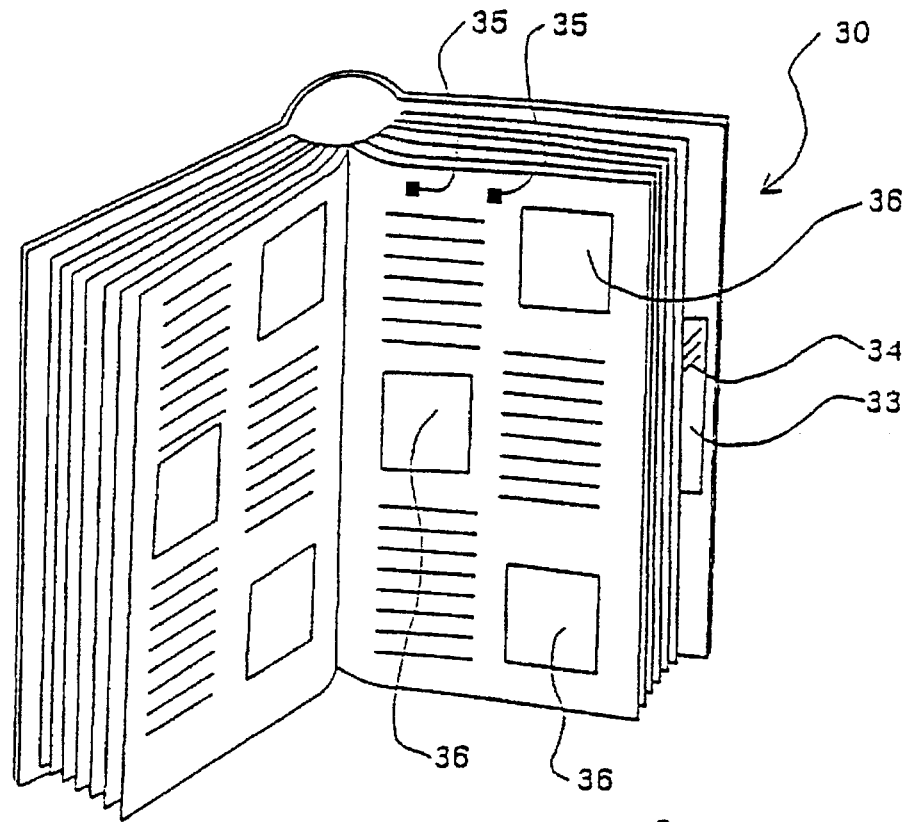
Figure 4:
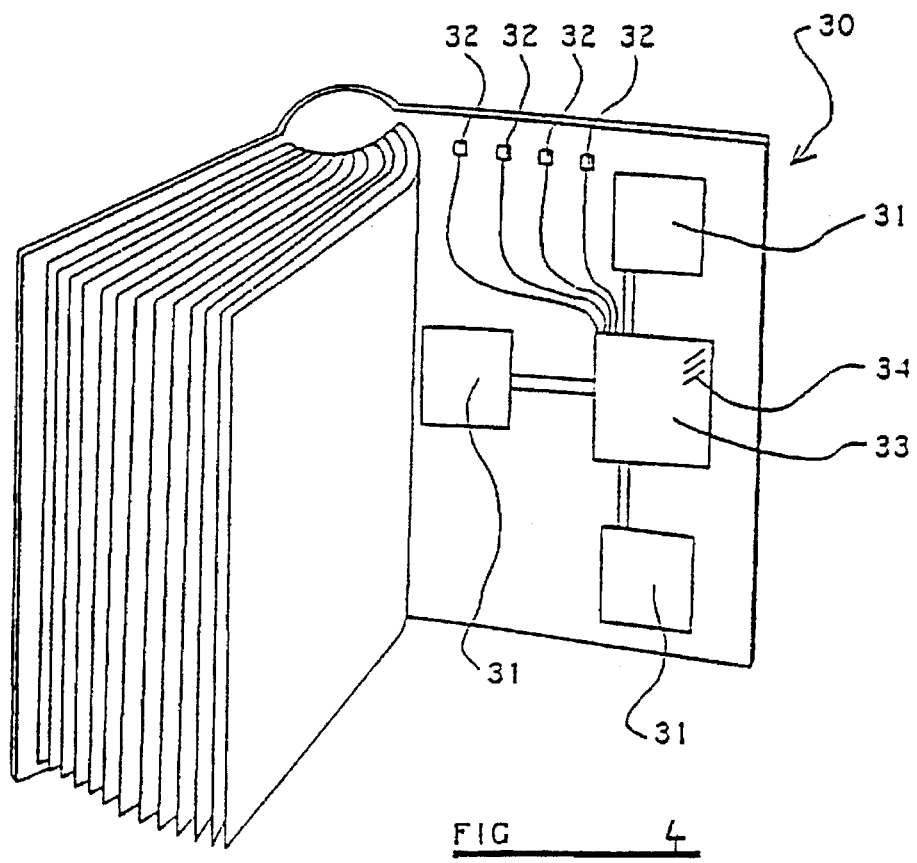
Figure 5:
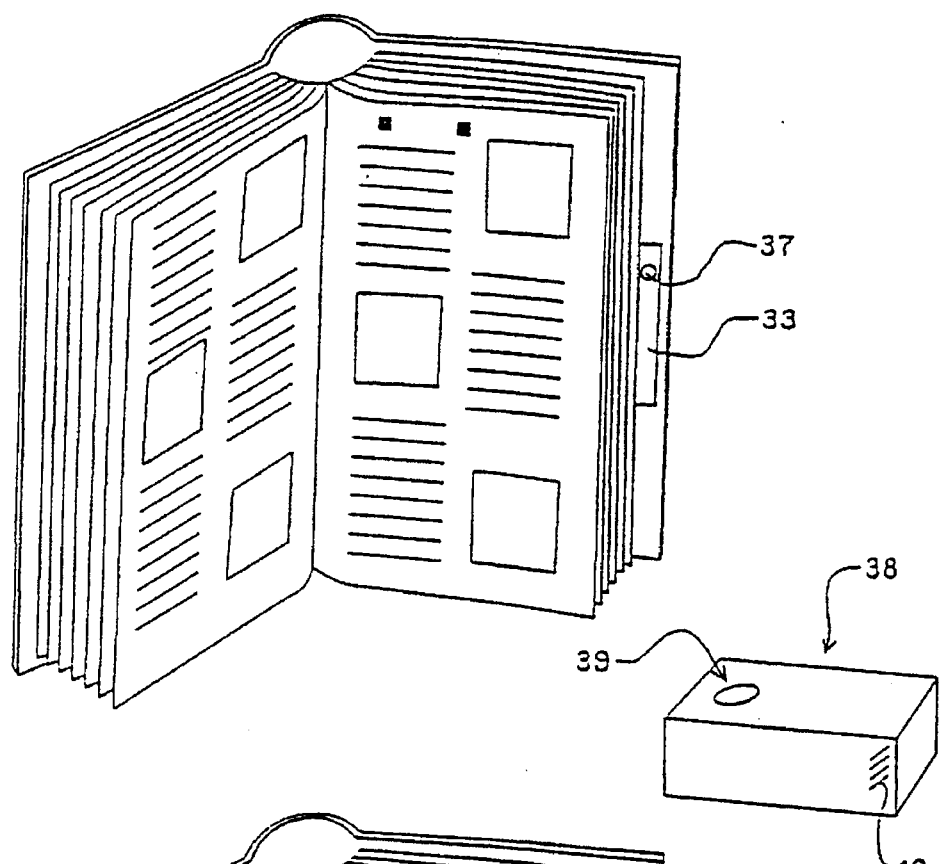
Figure 6:
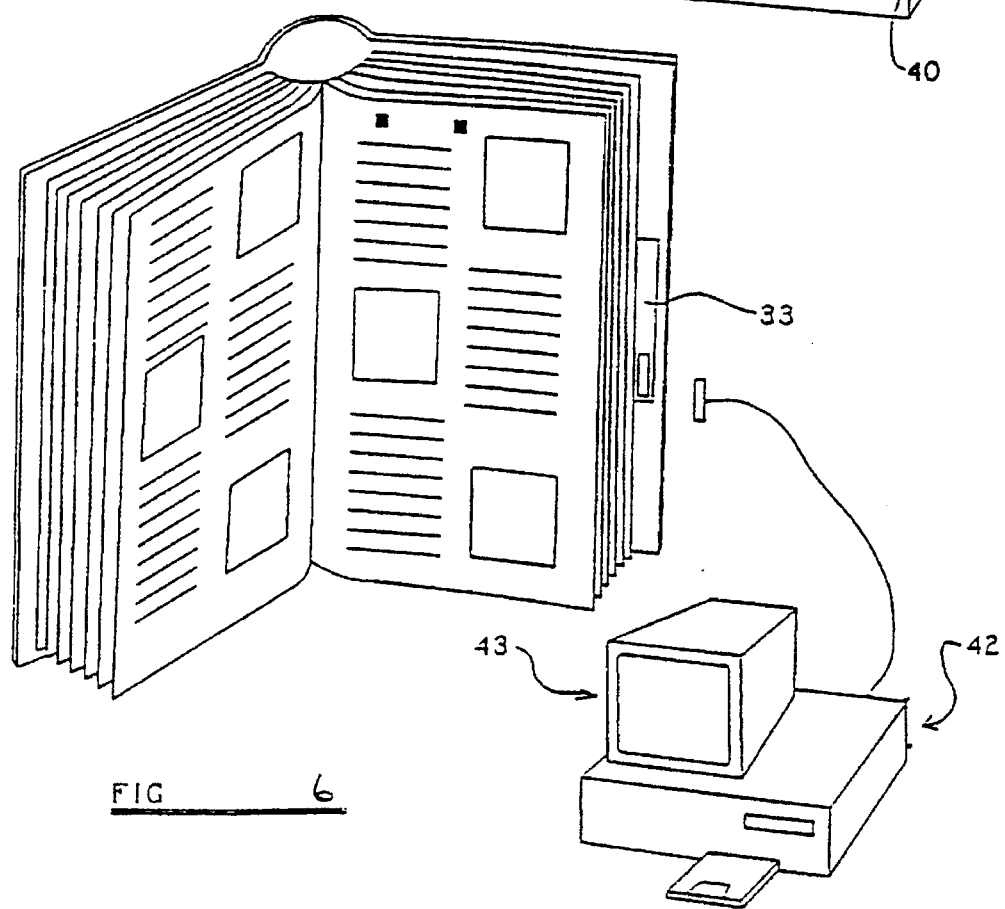

In order that the invention may be more readily understood, and so that further features thereof may be appreciated, the invention will now be described, by way of example, with reference to the accompanying drawings in which FIG. 1 is a perspective view, with parts thereof cut away, of a book in accordance with the invention, FIG. 2 is a view of a conductive track which forms part of the book of FIG. 1, FIG. 3 is a perspective view of another embodiment of a book in accordance with the invention, FIG. 4 is a view of the book of FIG. 3 opened to reveal the rear cover of the book, FIG. 5 illustrates another book in accordance with the invention, similar to that of FIG. 3, with an associated item of equipment, FIG. 6 illustrates another book, similar to that of FIG. 3, and further associated equipment, and FIG. 7 illustrates another book, similar to that of FIG. 3, with further associated equipment.

The invention will be described initially with reference to an embodiment of the invention which is in the form of a book 1. The book has, as is conventional, outer covers 2,3 inter-connected by a spine 4, and carries a number of pages 5. Some of the pages, such as the illustrated page on the left-hand side of the book 6, carry text, whereas some pages, such as the page 7 on the left-hand side of the book may carry pictures or illustrations. Of course, a page carrying illustrations may also carry printed text.

In the illustrated embodiment of the invention the page 7 carrying the illustration, carries a picture of a house 8 having a chimney 9, and a door 10, there being two bushes 11,12 located in the front of the house.

As can be seen from FIG. 1, a housing 13 is secured to the spine of the book. The housing 13 may have a different location, and may, for example, be embedded in one of the outer covers of the book. The housing 13 contains a microprocessor or the like, associated with an appropriate memory and a speech synthesizer, and a battery. The housing is accessible to enable the battery to be replaced. The speech synthesizer may be adapted truly to synthesise speech from data provided from the micro-processor or may produce recorded sound which has been digitised, the micro-processor storing, in an associated memory, digital data relating to the recorded sound. In each case the speech synthesizer is associated with a transducer, such as a Piezo electric transducer and the effect of the speech synthesizer is to cause the transducer to emit sound which is recognisable, by the human ear, as speech. The housing 13 is provided with apertures to permit sound from the transducer to be emitted from the housing, and the housing is positioned so that a person using the book can readily hear sound from the transducer.

A sensor arrangement is provided as will be described hereinafter in greater detail, which responds to a finger touching part of the illustration, which can effectively control the speech synthesizer.

It is envisaged, therefore, that the book may provide a printed instruction, present in the text either on the page shown to the left-hand side of the book, page 5, or the page shown at the right-hand side of the book, page 6, which, for example, which instructs a person reading the book to touch the house. If the house is touched the speech synthesizer will issue a message confirming that the correct item has been touched. Thus the speech synthesizer may emit sound corresponding to the words "Yes, that is the house—well done!". However, if the house is not touched the speech synthesizer may emit sound corresponding to the words "That was not the house—try again!". It will be appreciated that the speech synthesizer may emit sounds corresponding to various messages depending upon the content of the illustrations present in the book.

It is to be appreciated that (by a means that will be described hereinafter) when a predetermined area of the page is touched, for example the area carrying the page number, the voice synthesizer is activated with a specific message providing instructions as to what the person reading the book is to do. Thus, in the example set out above, when the page number is initially touched an instruction may be given "Can you put your finger on the house?". Depending upon whether the reader of the book puts his/her finger on the house or on some other part of the illustration, then an appropriate message may be given by the voice synthesizer. When all the required parts of the picture have been touched correctly, the voice synthesizer may give a message such as "Now proceed to the next page".

In the example given thus far the book would be intended for reading by relatively young people, and the illustration might be considered, for example, to be an illustration of the home of Snow White, the two bushes in front of the house being respectively the red rose-bush and the white rose-bush. However, it is to be appreciated that a book of the type being described may find many valuable applications as an educational device. The illustration may, therefore, be a cross-sectional view of a biological specimen, and the person reading the book may be required to identify the various parts of the specimen by touching the appropriate parts of the specimen when requested so to do. Indeed, it is envisaged that the page carrying the sensors (which will be described hereinafter) need not necessarily carry an illustration, but may carry printed material. For example the page may carry a mathematical problem and three or four possible answers to the problem. The person reading the book may be asked to touch an answer believed to be the correct answer. Depending upon which answer is touched, the voice synthesizer will be able to provide valuable information to the person using the book.

Many other uses for the general arrangement described herein may readily be devised.

Turning now to FIG. 2 of the accompanying drawings, there is illustrated a conductive track that may be applied to the cover of the book of FIG. 1. The track 20 is an elongate track which is formed of a conductive material printed on to the page. Many conductive inks are available for this purpose. The track 20 is of elongate form and comprises various thin track elements 21, and various enlarged areas or "icons" 22,23,24,25.

It can be seen that one enlarged area 24 is located where the page number is printed on the book. The other enlarged areas have a shape corresponding to and a position corresponding to the house 8 and the two bushes 11 and 12. The two ends of the conductive track 20 are connected, by appropriate wires, to the micro-processor contained within the housing 5.

The effect of a finger touching a page above one of the "icons" mentioned above, is to apply a capacitive coupling to earth to that icon. Because of the nature of the track 20 the resistance between one end of the track and that particular icon has a predetermined value and a resistance between that particular icon and the other end of the track has a predetermined value. Therefore, by determining the impedance of the path from each end of the path, it is possible to determine precisely which icon is being touched or pointed-at, at any particular instant.

Whilst the invention has thus far been described with reference to a sensor of a particular type is to be appreciated that other types of sensor may be used. For example, a sensor comprising rows and columns of conductive tracks, which are insulated from each other, (which thus comprises a grid of intersecting mutually insulated elements) may be used, so that wherever a finger is placed on the illustration it is possible for the sensor to determine the position of the finger. One possible disadvantage of a sensor of this type is that a very large number of connections have to be made between the ends of the conductive rows and columns and the micro-processor. The embodiment described above utilises only two connections between the track on each page and the micro-processor.

FIG. 3 illustrates a book 30 which comprises an embodiment of the invention, and FIG. 4 illustrates the book 30 open to reveal the interior of the rear cover of the book.

In this embodiment of the invention the rear cover of the book is provided with a sensor array. The sensor array, as illustrated, comprises a plurality of conductive areas 31 of a relatively large size at diverse positions on the inside of the rear cover of the book and the plurality of smaller areas 32 located in a row adjacent the top of the rear cover of the book. The conductive areas are all connected by appropriate conductive tracks to circuitry within a housing 33 which is embedded in the back of the book. The conductive areas may be on a single elongate track, like the track of FIG. 2.

The housing 33 contains a battery, and part of the cover of the housing may be readily removable to permit replacement of the battery. The housing 33 also contains a memory and a speech synthesizer of the type described above, together with an appropriate micro-processor or the like. The speech synthesizer is associated with Piezo electric transducer located within the housing adjacent part of the housing 33 which is provided with apertures 34 which permit sound from the transducer to emanate from the housing 33.

It is to be appreciated that a corresponding sensor array, including areas corresponding to the areas 31 and areas corresponding to the areas 32, may be provided on the inside of a front cover of the book, with the conductive areas of that array also being connected to the circuitry within the housing 33.

It can be observed, from FIG. 3, that when the book is opened, various marks 35 are provided on the exposed pages, substantially aligned with the areas 32 of the sensor array. A person using the book must place a finger on each of the marks 35 simultaneously, and the presence of the fingers is detected capacitatively by the sensor array. Thus, when the book is open, as illustrated in FIG. 3, when a finger is placed adjacent each of the two marks 35, effectively the fingers are located adjacent two of the conductive elements 32. The presence of the fingers adjacent those two elements will be detected, and the micro-processor contained within the housing 33 will then be able to determine precisely which page of the book is open. Each page is provided with a unique combination of marks 35.

It can be seen that in this example the book is provided with illustrations 36 which are substantially aligned with the areas 31 of the sensor array. When any one of the illustrations 36 is touched by a finger, that finger will be detected capacitatively as being adjacent a specific one of the conductive areas 31 of the sensor array, and the micro-processor contained within the housing 33 will be able to determine an audible message which is to be effectively transmitted to the user of the book through the transducer that forms part of the speech synthesizer within the housing 33.

It is envisaged that when a book is opened at a specific page, the person using the book will touch the marks 35 to indicate to the micro-processor which page is open. The micro-processor then may issue an audible instruction for the person using the book to perform a certain act, for example, touching one of the illustrations present in the book, or the text of the book may provide the instruction. When a person touches an illustration, an appropriate response is generated by the micro-processor and transmitted through the speech synthesizer.

The book of FIGS. 3 and 4 has only a single sensor array, provided in the covers of the book and only this single array is connected to the housing containing the micro-processor.

It is to be appreciated that, whilst in the foregoing description reference has been made to a book, having an outer cover and a plurality of pages, the book may be a very simple publication such as a magazine.

Whilst, in the embodiments described above, the micro-processor, the associated memory, and the voice synthesizer have all been mounted on the book, so that the book, together with all these components, is manufactured and sold as a single integral entity, FIG. 5 illustrates a modified embodiment of the invention which incorporates a book very similar to that illustrated in FIG. 3 with the exception that the housing 33 is not provided with a transducer, but instead is provided with an exposed light-emitter 37. Associated with the book is a separate housing 38 which is provided with a light detector 39 and a transducer which is located adjacent an apertured region 40 of the housing 38 to permit sound to emanate from the housing 38.

In the embodiment of FIG. 5 it is envisaged that the back of the book will be provided with a sensor array comprising the conductive areas 31 and 32 as described with reference to FIG. 4. Contained within the housing 33 is a microprocessor and a memory arrangement. When the microprocessor wishes an audible signal to be generated, the appropriate signals are appropriately encoded and are passed to the light-emitter, the signals being emitted as encoded light. The encoded light is detected by the detector 39, and is passed to a voice synthesizer within the housing 38. The appropriate sound emanates from the housing through the apertures 40.

Because the voice synthesizer and the transducer are not present on the book it is possible to use the housing 38 with a plurality of different books. This means that, from an economic point of view, the quality of the voice synthesizer and the transducer may be enhanced, since a single voice synthesizer and transducer may be used with a relatively large number of books.

Whilst, in the embodiment of FIG. 5, the effective link between the book and the housing 38 is described as being an optical link, other types of link could be utilised such as a link involving electro-magnetic radiation, in which case the book would be provided with a low power radio transmitter and the housing 38 would be provided with a radio receiver, or even a wire may be provided which extends from the housing 38 and plugs into the book or which extends from the book and plugs into the housing 38. If this expedient is adopted it is possible that the book may be totally passive and not include a power source such as a battery, the necessary power being supplied to the book through the wire and plug-and-socket connection.

The embodiment of FIG. 5 may be further modified, with the housing 33 present on the book not containing any "memory" containing information concerning the audible messages to be emanated. Thus the housing 33 would simply contain an appropriate circuit to determine which page of the book is open and precisely where a finger is touching the page, the circuit being adapted to transmit appropriately coded information to the housing 38. The housing 39 would then be provided with means to receive an appropriate "memory" containing the various messages to be transmitted. This may be in the form of a plug-in ROM (Read Only Memory) which is supplied together with the book and which is plugged into an appropriate socket within the housing 38 whenever the specific book is to be used, or may comprise another conventional data storage medium such as a tape cassette, or a magnetic or optical disc, which is supplied to the book and which is inserted into an appropriate tape-player, or disc-reader which is associated with the housing 38. One advantage of using this expedient would be that a much greater amount of data could be available for use at an economic price, than if the data is stored in integrated circuit memory which is mounted on the book.

It will thus be appreciated that the transducer may be mounted on the book or off the book, and the necessary memory which stores the alternate audible messages that may be generated may be present on the book or off the book. Also, it is to be appreciated that the memory may be integrated circuit memory, in the form of ROM or RAM, or may be other types of data recording and reproducing means, such as tape or disc.

Whilst, in the description of the various embodiments given above reference has been made to a voice synthesizer, which operates to produce an audible sound which is recognisable as human speech, in alternative embodiments a sound generator may be provided which emits other predetermined sounds.

FIG. 6 illustrates another embodiment of a book in accordance with the invention, corresponding broadly to the book of FIG. 3. The housing 33 is provided with a socket adapted to receive a plug 41 which is connected to a computer arrangement 42.

The housing 33 contains sufficient circuitry to enable signals to be sent, through the plug 41, to the computer 42 indicating where a finger is touching a specific page of the book. The computer 42 is illustrated as being provided with a monitor 43 and is adapted to receive a disc 44 containing data corresponding to the particular book. It is thus envisaged that a book will be provided together with a disc containing data, and the disc can be inserted in a computer, such as the computer 42, which is physically connected to the book. The data present on the disc inserted in the computer may take a wide variety of forms, but will relate to matter present within the book. The arrangement may be used as a teaching aid, with the computer initially issuing an instruction, either visual or audible, for a pupil to find a specific item of subject matter in the book, thus requiring the pupil to open the book at the correct page, and touch the marks 35 indicating precisely where the book has been opened and then touching an appropriate illustration, the computer then providing further appropriate visible or audible messages.

Alternatively, the book may be more in the form of a "magazine" and may relate to a computer game.

In modified versions of this embodiment the book or magazine may be connected to the computer by an optical or electro-magnetic link, of the type described above with reference to FIG. 5.

FIG. 7 illustrates a further embodiment of the invention which is primarily suitable for use as a teaching aid, particularly where no adequately qualified teacher is present. The book 30, as in the embodiment of FIG. 8, is provided with a socket present in the housing 33 adapted to receive a plug 45 which is connected to a radio receiver assembly 46. The housing 33 contains sufficient circuitry to send, through the socket-and-plug connection 45, to the radio receiver 46, signals representative of where a finger is present on a page of the book. Alternatively the links between the book and the assembly 46 may be an optical or an electro-magnetic link as described with reference to FIG. 7.

The radio receiver assembly 46 is adapted to receive signals through an antenna 47, the received signals being de-modulated by a demodular 48 and then passed to a de-coder 49. The de-coded signals are fed to a processor 50. Signals from the processor 50 may either be stored in a memory 51 or may be fed directly to an audio output 52 depending upon the coding that precedes each signal received. Thus the combination of the de-coder and the processor determine whether any particular signal is stored in memory, or is fed directly to the audio output. The audio output may pass, for example, to an ear-piece or pair of headphones for the person using the book, if the book is to be used in a classroom situation, or may be passed to a loud speaker.

It is envisaged that, when the apparatus of FIG. 7 is to be used as a teaching aid, initially a plurality of signals, preceded by appropriate codes, will be transmitted and will be stored in the memory 51. Subsequently a further signal will be transmitted, with an appropriate code, which would pass directly to the audio output. This signal will comprise an instruction to a person using the book to touch a specific area of the book. Depending upon which area is touched, one of the signals stored in the memory will be passed, by the processor, to the audio output. One of the signals stored in the memory may be a "central" signal, which effectively controls the processor, causing the signals in the appropriate part of the memory to be transferred to the audio output wherever a specific sensor of the sensor array is activated. This control signal will be up-dated from time-to-time.

It is conceivable that if, for example, a doubleside band receiver is utilised, the signals to be stored in the memory may be transmitted simultaneously with the initial signal that is passed to the audio output providing the instruction. While the signals may be preceded by a code, as described above, to enable the receiver assembly to identify which signals are to be stored in which areas of memory, and which signals are to be passed immediately to the audio output, in a modified embodiment the different signals may be provided on different channels, such as time multiplexed channels.

It is also envisaged that, in a modified embodiment of FIG. 7, instead of a radio receiver 46 being utilised, a television receiver could be utilised. In such an arrangement, audio visual signal preceded by an appropriate code would be stored in a memory 51 which might be embodied by a read-write optical disc or an audio tape arrangement. When part of the book is touched in response to an instruction, the-appropriate audio visual signal would be played.

Whilst, in the description given above, various techniques have been disclosed for identifying the page at which a book is opened, an alternative technique, it is envisaged, could be used. In this technique a separate strip of sensors would be provided mounted on the cover of the book adjacent the pages when the pages are open. The strip would be located so that when the book is open the strip is not covered by any one of the pages, but is accessible, and can be directly touched by a finger. Because the sensor can be touched directly by a finger, the sensor can have relatively fine resolution.

It is envisaged that each page of the book will carry a mark, such as an arrow or the like, printed on the book adjacent the edge of the page which is in the region of the sensor. When the book is opened a person will touch the sensor at the position indicated by the arrow, consequently providing an accurate indication of the page at which the book is opened. It is, of course, conceivable that it will be necessary for there to be two marks, such as two arrows, with the sensor strip being touched at the two positions indicated by the two arrows, if there are a large number of pages in the book.

I claim:

1. A book or magazine comprising front and back covers, a spine and a plurality of pages carrying printing;

a pressure sensor located in at least one of the front and back covers, said pressure sensor sensing the application of pressure to the sensor when pressure is applied to a page overlying the corresponding cover at an area in alignment with the sensor;

and a sound generator connected to the pressure sensor, the pressure sensor being adapted to cause the sound generator to generate sounds associated with the position of the sensor and in dependence upon the page which is pressed.

2. A book or magazine comprising front and back covers, a spine and a plurality of pages carrying printing, a plurality of pressure sensors carried on the book and mounted on at least one of the front and back covers of the book to sense when a finger touches a page overlying the corresponding cover at a location aligned with a sensor, and a sound generator connected to the sensors, the sensors being adapted to cause the sound generator to generate sounds associated with the positions of the sensor, and in dependence upon the page which is touched.

3. A toy or educational device according to claim 1 or 2, wherein the sound generator is contained within a housing which is mounted in a cover of the book or mounted within the spine of the book.

4. A toy or educational device according to claim 1 or 2, wherein the sound generator is separated from the book, said device further comprising means for passing signals from the book to the sound generator.

5. A toy or educational device according to claim 4, wherein an electrical connection, including a plug and socket, extends between the book and the sound generator.

6. A toy or educational device according to claim 5, wherein the book is provided with means adapted to transmit signals in response to a finger touching a predetermined area on a page of the book to apply pressure to a pressure sensor aligned therewith, the sound generator being provided with means adapted to receive the signals.

7. A toy or educational device according to claim 6, wherein the signals are indicative of the area of the page that has been touched, the means adapted to transmit signals containing a memory storing signals appropriate to be passed to the sound generating when pressure is applied to a pressure sensor.

* * * * *